United States Patent [19]

Mayer et al.

[11] 4,241,973
[45] Dec. 30, 1980

[54] COAXIAL CABLE TERMINAL CONNECTOR ESPECIALLY SUITABLE FOR HIGH-VOLTAGE, LOW-CURRENT ELECTROSTATIC USES AND METHOD OF MAKING SAME

[75] Inventors: Thomas A. Mayer, Allison Park; James E. Sickles, Glenshaw, both of Pa.

[73] Assignee: PPG Industries, Inc., Pittsburgh, Pa.

[21] Appl. No.: 931,063

[22] Filed: Aug. 4, 1978

[51] Int. Cl.³ .................. H01R 11/11; H02G 1/14
[52] U.S. Cl. .................. 339/143 R; 174/73 R; 174/89; 29/858
[58] Field of Search .................. 174/73 R, 73 SC, 89; 339/104, 143 R, 218 R; 264/250; 239/690, 691, 692, 693; 29/857, 858

[56] References Cited

U.S. PATENT DOCUMENTS

| 1,625,449 | 4/1927 | Bohn et al. | 264/250 |
| 2,827,508 | 3/1958 | Roehmann | 174/73 R |
| 3,171,707 | 3/1965 | Powell | 174/89 |
| 3,264,602 | 8/1966 | Schwartz | 174/89 |
| 3,317,882 | 5/1967 | Schumacher | 174/73 R X |
| 3,492,409 | 1/1970 | Williams et al. | 239/690 X |
| 3,678,446 | 7/1972 | Siebelist | 174/89 X |
| 3,793,614 | 2/1974 | Tachick et al. | 339/143 R |
| 3,982,059 | 9/1976 | Holland et al. | 174/73 R |
| 3,995,930 | 12/1976 | Herrmann, Jr. | 174/89 X |

FOREIGN PATENT DOCUMENTS

| 621652 | 6/1961 | Canada | 174/89 |
| 1129203 | 5/1962 | Fed. Rep. of Germany | 174/89 |
| 2441091 | 3/1976 | Fed. Rep. of Germany | 174/73 R |
| 568596 | 4/1945 | United Kingdom | 339/218 R |

*Primary Examiner*—Roy N. Envall, Jr.
*Assistant Examiner*—E. Frederick Borchelt
*Attorney, Agent, or Firm*—George D. Morris

[57] ABSTRACT

A cable terminal connector includes means for securing a terminus of a grounding or shielding conductor of a coaxial or non-coaxial type cable within a body of dielectric material. The junction of the grounding or shielding conductor with the dielectric material is characterized by means for distributing and lessening the intensities of mechanical or electrical stresses that may occur at the junction during use of the terminal connector in transmitting high DC voltage, low current power for electrostatic applications.

12 Claims, 1 Drawing Figure

4,241,973

COAXIAL CABLE TERMINAL CONNECTOR ESPECIALLY SUITABLE FOR HIGH-VOLTAGE, LOW-CURRENT ELECTROSTATIC USES AND METHOD OF MAKING SAME

BACKGROUND OF THE INVENTION

Field of the Invention

Coaxial cable connectors for joining together high voltage transmitting components are well known. Of particular interest herein is a coaxial cable terminal connector of miniature size that is useful for high-voltage, low-current electrostatic applications.

State of the Art

Connections between high voltage transmitting elements usually require special insulating materials and design to avoid mechanical or electrical failures. In connections made between coaxial or triaxial cables and terminals adapted to mate with other high voltage carrying components, the conducting elements must be terminated and connected to terminal contacts in a manner that avoids creating regions of mechanical or electrical stress within or around the connections.

In certain electrostatic applications requiring relatively low currents, such as 100 microamps or less, delivered at relatively high DC voltages, such as 25,000 volts or more, the junctions between a coaxial cable and its termianl may be subjected to particularly high electrical stresses. An electrostatic application of particular interest herein is induction charging electrostatic spraying of film-forming materials, utilizing components, for example, as disclosed in U.S. Pat. No. 4,009,829 to J. E. Sickles. In an induction charging spraying system, a coaxial cable is typically utilized to deliver through its central conductor a charging potential of 25,000 volts, or more, from a DC power supply to a charging electrode of the spray apparatus. The outer ground conductor of the coaxial cable is usually connected at one end to a ground point on the power supply. Unlike most other uses of coaxial cables, however, the outer coaxial ground conductor may not be in electrical connection with a conducting element at the other end of the cable which is connected at the spray device. The ground conductor in this electrostatic application has different functions.

Firstly, the ground lead, since it is grounded at the power supply, provides a "safety shield" between the high voltage-carrying central conductor of the coaxial cable and an equipment operator. Such a safety shield is of particular importance in spraying operations utilizing hand-held spraying devices and remotely located power supplies, which components are connected together by a coaxial cable of typically 20 feet in length.

For example, the insulation of a coaxial cable high voltage central conductor may develop cracks with age under the flexing, bending or twisting forces to which the cable is subjected during its normal use. These cracks may trap moisture or coating material particles and thereby provide leakage paths for current from the high voltage central conductor. A grounded shield surrounding a cracked portion of an insulated central conductor ensures a safe, conductive path to ground for dissipation of these leakage currents to prevent uncomfortable or potentially hazardous electrical shocks to equipment operators.

Also, in a typical industrial spraying operation that requires hand-held electrostatic spray guns, a rather fragile, light-weight coaxial cable is usually preferred because the light weight of the cable attached at the spray gun increases maneuverability of the hand-held gun and reduces operator fatigue. Such a lightweight cable is, however, more vulnerable to breaking or severing by a piece of heavy machinery or other equipment found in many industrial spraying environments. An outer ground shield surrounding, and in close proximity to, an exposed portion of the central high voltage conductor of a broken cable provides a conductive path to ground and thereby lessens the chance of shock to equipment operators. Moreover, the ground shield lessens the likelihood of sparks that may occur from the broken or exposed high voltage central conductor to a grounded piece of equipment, which sparks may ignite flammable coating materials or paint solvent vapors and cause fire or explosion.

A second feature of a grounded outer conductor surrounding a coaxial cable central conductor which is especially advantageous in an induction-charging spraying system is that the outer conductor provides a Faraday shield for the insulated central conductor. For example, an insulated central conductor carrying a voltage of 25,000 volts DC, or more, may induce charge at the outer surface of the dielectric insulating material having a polarity the same as that of the high voltage carried by the central conductor. An induction-charging spraying system characteristically induces charge on spray particles with a polarity opposite that of the high voltage electrode. Since the induced charge on the outer dielectric material surface of the insulated central conductor has a polarity the same as the high voltage induction-charging electrode, charged spray particles would be strongly attracted to the unshielded dielectric surface of the insulated central conductor. The presence of a braided ground shield surrounding the insulated central conductor provides a Faraday shield which reduces the effects of external electrostatic forces on stray charged particles and thus reduces charged particle attraction and accumulation which would otherwise occur on the exposed surface of the insulation covering the central conductor.

There is a further advantage of a coaxial cable having one end grounded and the other end electrically "floating" that is peculiar to electrostatic spraying systems. The circuit elements of a high voltage electrostatic system typically have significant capacitive properties for which accomodation must be made in the charging circuit by adjustment of other spray-charging parameters such as electrode charging voltage, electrode spacing relative to the spray stream, or coating material and air flow velocities. Once the values of those parameters are established to account for circuitry capacitive effects, it is highly desirable that circuit capacitive contributions remain relatively constant. Though an unshielded, single-conductor cable may deliver high voltage to a charging electrode, such a cable may introduce unpredictable capacitive effects into the charging circuit. This occurs because the high voltage conductor itself may form one plate of a capacitor system with the other plate being the spray operator or a grounded metal object in the spraying environment. The capacitance of this system may change depending upon whether the cable is coiled up, stretched out or draped over a metallic object. These changes in capacitance, in turn, may require alteration of other spray-charging parameters in order to maintain maximum particle charging efficiency during a spraying operation. On the other hand, a shielded cable having one end of the outer conductor grounded and the other end "floating," or terminating in a dielectric material, provides a relatively constant capacitance which is predictably proportional to cable length. Hence, only a one-time adjustment of spraying parameters needs to be made to account for this capacitive contribution, with further readjustment not usually necessary.

The termination of a coaxial cable ground conductor within the dielectric material of a connector terminal at the spray gun end of the cable presents special problems inasmuch as there are several competing criteria which must be satisfied to provide a suitable terminal connector of good mechanical and electrical integrity. Firstly, a hand-held spray gun is virtually constantly in motion between a multitude of varying orientations during a spraying operation, so that a coaxial cable connection at the spray gun will undergo a great deal of bending and twisting. Hence, a connection between a braided ground conductor of a coaxial cable and the dielectric material of the terminal connector must form a good mechanical junction so that flexing of the terminal connector will not cause breakage of the wires making up the braid of the ground conductor. Secondly, the coaxial cable braided ground conductor must terminate within the dielectric material of the terminal connector in a manner to minimize local electrical stresses created by the intense electric field between a high-voltage carrying central conductor and the individual termini of the grounding conductor braid wires. Thirdly, the materials chosen for fabricating both the cable and the terminal connector must be highly resilient to provide good flexibility. Fourthly, the insulating materials making up the cable and the terminal connector must possess high resistance to attack form chemicals and solvents typically found in paint spraying environments. Fifthly, the insulating materials used in the cable and terminal connector must have high dielectric strength to resist electrical break-down. Sixthly, the cable and terminal connector must be lightweight. Lightness of weight is especially important, as mentioned before, inasmuch as reduced weight of a cable connection at the forward end of a hand-held spray gun enhances the utility of the spray gun in the spraying operation.

It is somewhat of a dilemma in providing a suitable coaxial cable terminal connector that components molded from the very materials which satisfy the criteria of good flexibility, resistance to chemical attack, high dielectric strength and lightness in weight, are generally characterized as having slippery, non-gripping surfaces. Hence, it is difficult to join these components with each other or with other materials. There is especial difficulty in making good junctions or connections between these slippery materials and the fine, rather fragile wires of a lightweight coaxial cable.

SUMMARY OF THE INVENTION

Improvements in the mechanical and electrical integrity of a junction between a cable and a high voltage contact element may be provided by a cable terminal connector of the invention. The cable terminal connector comprises means for securing a high-voltage, first conductor of a cable in rigid electrical and mechanical connection to a high-voltage contact element, means for securing a second conductor surrounding the first conductor of the cable in flexible mechanical connection to a body of dielectric material to provide (a) mechanical stress relief by distributing the flexing, twisting, or pulling forces which occur at the juncture of the material comprising the second conductor and the body of dielectric material, and (b) electrical stress relief by lessening the intensity of an electric field that may exist between the high voltage carrying first conductor and the terminus of the second conductor of the cable.

The means for securing a high-voltage first conductor of a cable, such as a central conductor of a coaxial cable, to a high voltage contact element may comprise a terminal body fabricated of dielectric material. The terminal body may have a central passageway connecting opposite head and tail end portions, the head end portion having a high-voltage contact element molded within the body of dielectric material across the passageway. The tail end of the terminal body may have a generally frustro-conical configuration. The axis of the frustro-conically shaped tail portion lies generally coaxially with respect to the axis of the passageway. An insulated first conductor enters the passageway at the tail end of the terminal body, passes through the body and terminates in electrical connection with the high voltage contact at the head end of the terminal body.

A second component of the cable terminal connector of the invention includes means for securing a second conductor to the terminal body of dielectric material, the second conductor exemplified by a shield or grounding conductor surrounding and coaxial with the central conductor of a coaxial cable. At the tail end portion of the body of dielectric material, the second conductor is flared away from the insulated first conductor. The flared terminus portion of the second conductor lies upon the tapered wall of the terminal body tail end portion so that at least a portion of the flared terminus of the second conductor diverges from the first conductor. The flared pòrtion of the second conductor terminates at a radial distance from the first conductor which is substantially greater than the radial distance that exists between the first conductor and an unflared portion of the second conductor of the cable. A sheath of dielectric material has a cavity in one end portion, the cavity having a configuration and size suitable to receive the tapered tail end portion of the terminal body. When the terminal body tail end is nested within the cavity of the sheath, the flared portion is firmly secured at the interface formed between the adjacent walls of the terminal body tail end and the cavity. There is thus provided by the relatively broad area of wall contact at the interface means for distributing stress occurring at the junction of the second conductor and the dielectric material. This flared arrangement of the second conductor secured between walls of the dielectric material also provides means for lessening the intensity of the electric field existing within the dielectric material at the junction by the relatively increased spacing provided between the terminus of the second conductor and the high voltage first conductor.

BRIEF DESCRIPTION OF THE DRAWINGS

The accompanying drawings illustrate an example of one embodiment of the invention constructed according to the best mode so far devised for the practical application of the principles thereof, and in which:

FIG. 1 is a side elevation view, partly in section, showing an assembly of a coaxial cable terminal connector joined to a terminus of a coaxial cable, the elements of a typical coaxial cable being shown in an enlarged fragmentary view.

DESCRIPTION OF A PREFERRED EMBODIMENT

Figure 1:
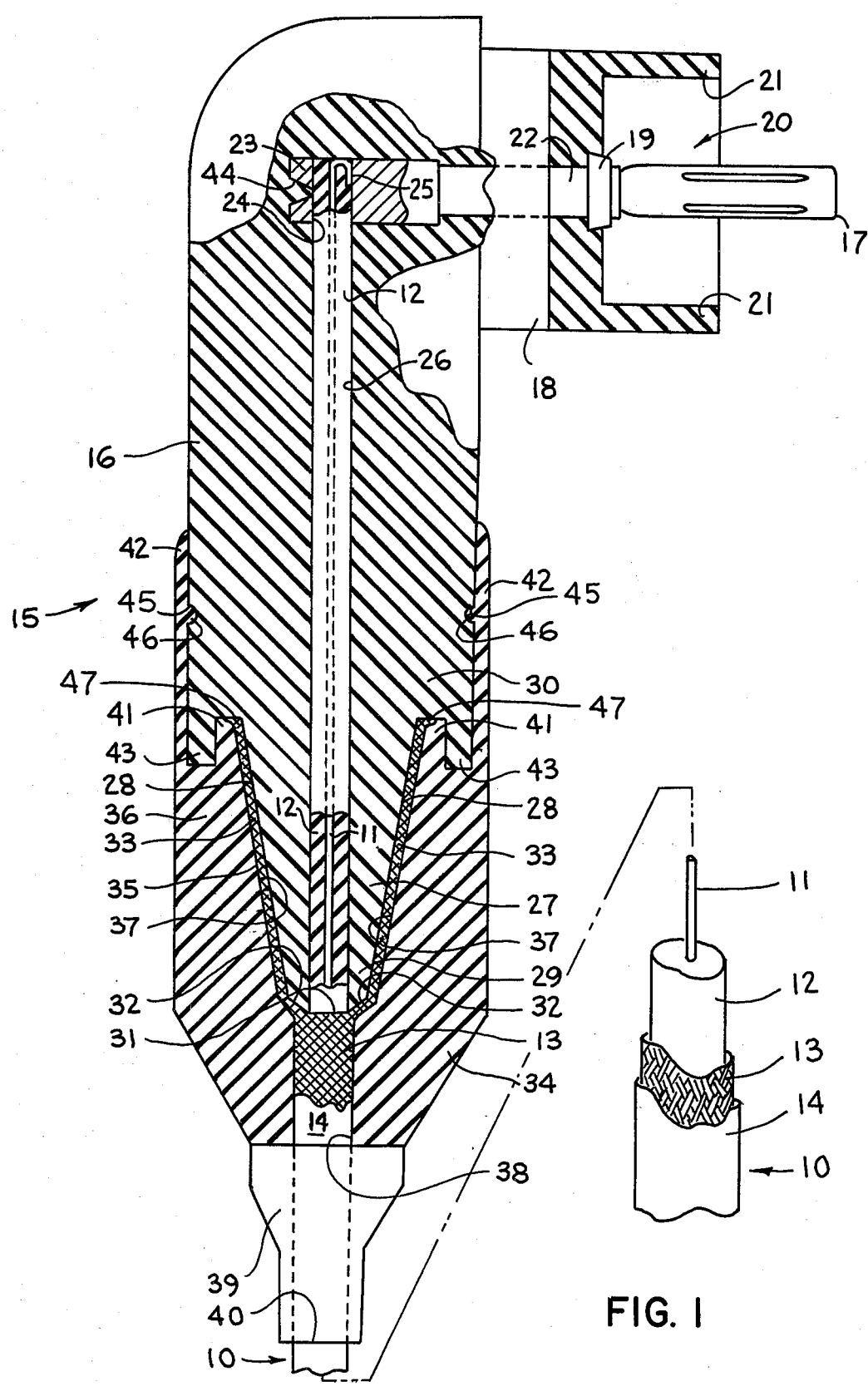

Depicted in FIG. 1 is one embodiment of a coaxial cable terminal connector of the invention that provides means for connecting a coaxial cable terminus to other circuit elements of an induction charging spraying system.

A typical coaxial cable 10 is depicted in an enlarged fragementary section view in FIG. 1. The cable comprises a central high-voltage conductor 11 which is typically made of copper or aluminum. Surrounding central high voltage conductor 11 is a first insulating jacket 12 fabricated of a generally flexible, high dielectric material. Concentric to high voltage conductor 11 and surrounding first insulating jacket 12 is an outer ground or shielding conductor 13 which typically comprises a woven braid of conductive material such as copper or aluminum. Covering the braid of ground shield conductor 13 is a second insulating jacket 14 which desirably has good dielectric properties and high resistance to chemical attack and mechanical abrasion. The thickness of high voltage conductor 11, its material, the thickness and type of material of first insulating jacket 12, and the radial distance between central conductor 11 and grounding shield lead 13 is dependent upon the particular application to which the coaxial cable is put. In an induction charging electrostatic spraying system where coaxial cable 10 is provided to transmit a DC voltage of about 25,000 volts with a current of up to about 100 microamps over a distance of about 20 feet from a power supply to induction charging elements at the spray gun end of the cable, small diameter RG-180 type cable has been found suitable.

A terminal 15 comprises an elongated body 16 which is fabricated of a dielectric material having good mechanical strength and high dielectric strength. Suitable dielectric materials include phenolic plastics as a class, as well as Teflon plastics. These types of dielectric materials, generally characterized as high temperature, thermosetting plastics, provide a terminal body 16 having high rigidity, high dielectric strength and good chemical resistance.

Molded within one end portion of terminal body 16 is a male-type, high voltage contact element in the form of a commonly-available banana plug 17, that is, a plug-type projection having a spring-metal tip shaped like a banana. Alternatively, the high voltage contact element may comprise a flat contact metal plate, or may be in the form of a female-type metallic receptacle such as the mating electrical contact element for a conventional banana plug. The banana plug high voltage contact element 17 is illustrated as molded into terminal body 16 within a plug-like extension 18 disposed at a right angle to the elongated portion of the body, but may, as well, extend at any angle from elongated terminal body 16. As depicted in FIG. 1, banana plug 17 is anchored at its base 19 within a cavity 20 of plug-like extension 18. Wall 21 of cavity 20 is slidably engageable with a complementary-shaped receptacle wall of a high voltage contact element at the spray-device end of an induction charging system such as disclosed in the aforementioned U.S. Pat. No. 4,009,829. The engagement of these complementary, friction-fitting walls serves to guide banana plug 17 into electrical contact with a mating high-voltage contact element of an induction charging spraying device and provides mechanical support and fastening of terminal 15 onto the mentioned electrostatic charging elements of a spraying system. The plug-like terminal is especially suitable for making high voltage contact with a high voltage input terminal of an adapting means for an induction charging electrostatic adapter head, which adapting means is disclosed in U.S. application Ser. No. 931,062, filed on even date herewith, of J. E. Sickles, the disclosure of which is incorporated herein by reference.

It should be noted that plug-like extension 18 depicted in FIG. 1 has a cavity wall 21 of relatively deep extent as compared to typically available banana-plug type connectors. The relatively great depth of wall 21 decreases the likelihood of current leakage by way of surface tracking or cracks in the dielectric material of terminal body 16 by providing a relatively long path length between the high voltage banana plug and exterior points at lower potential.

Extending into terminal body 16 from banana plug base 19 is a conductor element 22 which electrically connects banana plug 17 with a receptacle clamp 23. Within receptacle 23 is a passageway 24 having a diameter suitable to receive the high voltage central conductor 11 and its insulating jacket 12. Typically, an electrical connection between central conductor 11 and receptacle 23 is provided by a terminus portion 25 of conductor 11 abutting the wall of passageway 24. As shown in FIG. 1, conductor terminus portion 25 has a U-shaped configuration and lacks a covering of insulating material 12. Typically, central conductor terminus portion 25 may be formed by firstly removing a portion of insulating material 12 from the terminus or end of central conductor 11. Then the exposed portion of central conductor 11 may be bent around the end of the remaining insulation 12 to lie along the outside of the jacket of insulating material. When this terminus portion 25 is inserted into passageway 24 of receptacle 23, a friction fit ensures good electrical contact between a portion of the wall of passageway 24 and the terminus portion 25 lying along the outside of the insulating jacket. Typically, the flexible, rather resilient material from which insulating jacket 12 is made will impart a spring-like bias to terminus wire portion 25 to ensure faithful electrical contact with receptacle 23. Since the insulated central conductor is typically inserted into the terminal body 16 with some force, the compression forces within insulation jacket 12 at the terminus portion will urge the insulating material to fill the voids around wire terminus 25 and thereby aid in mechanically securing the insulated central conductor within receptacle 23.

Banana plug base 19, receptacle 23 and their connecting conductor element 22 may be integrally formed of any electrically conducting metallic material as a unitary body which may, in turn, be encapsulated within terminal body 16 when the body is formed from a high temperature molded plastic. Receptacle 23 is also characterized in having a notch 44 which aids in firmly securing receptacle 23 within the body of dielectric material of terminal body 16 as it is molded.

Terminal body 16, when molded of one of the aforementioned high temperature molding plastics, typically has formed within its body a passageway 26 extending generally coaxially with respect to the axis of the elongated terminal body 16. Passageway 26 has a diameter approximating that of passageway 24 of receptacle 23 and is in communication with receptacle passage 24. Terminal body passageway 26 extends from receptacle 23 to an opposite end portion of the terminal body, which opposite end comprises a tail end portion 27 having a generally frusto-conical configuration. Passageway 26 is generally coaxially disposed with respect to frusto-conical shaped tail end 27 such that sloping or tapering side wall 28 of tail end 27 gradually diverges from the passageway axis from a tip 29 on tail end 27 toward base 30 of tail end 27. Tip 29 also preferably has a frusto-conical shape, the narrower angular-shaped end of which defines an orifice 31 that is generally concentric with the axis of passageway 26.

The diameter of orifice 31 at the end of passageway 26 is somewhat critical inasmuch as it must be of sufficient size to admit only a coaxial cable central conductor 11 bearing its insulating jacket 12. In the assembly of terminal body 16 onto a terminus of a coaxial cable, the ground shield conductor 13 will be stripped back a length sufficient to permit insertion of a portion of central conductor 11 bearing its insulated jacket 12 into orifice 31, which length is less than the total lengths of passageways 24 and 26 in tandem. As the insulated high voltage central conductor is inserted further into passageway 26, the braided ground conductor 13, from which insulating jacket 14 has been stripped, will be prevented from entering passageway 26 because of the close-tolerance fit between orifice 31 and the inserted portion of the insulated central conductor. The braided ground conductor 13 will thus be forced away from insulating jacket 12 of the central conductor 11 as the insulated central conductor travels further into passageway 26. Thus tapered wall 32 of frusto-conical tip 29 in cooperation with the close tolerance fit between the insulated central conductor and orifice 31 provides the means for separating braided ground conductor 13 from the insulated high voltage conductor. Tapered wall 32 also provides means for flaring the terminus of the braided ground conductor 13 so that individual wires of braided conductor 13 extend outwardly from the axis of central conductor 11. Thus, individual wires of the braid terminate at a distance from the central conductor axis that is greater than the radial distance between central conductor 11 and braided outer conductor 13 of an unseparated portion of coaxial cable 10.

In the assembly of a coaxial cable terminus onto terminal body 16, the separating and flaring of braided ground conductor 13 from the insulated central conductor forms a mesh 33 of wires separated or broken away from the braid of ground conductor 13. In order to provide mechanical and electrical securement of this mesh of ground wires to terminal body 16, a sheath 34 of dielectric material is fitted over and joined to tail end 27 of terminal body 16. Sheath 34 is fabricated of a low-temperature molding material having good dielectric and electric stress-resistant properties and having good flexibility relative to the more rigid phenolic material typically used for making terminal body 16. Suitable low-temperature molding materials for sheath 34 include polyethylene or rubber-reinforced polyethylene materials.

As depicted in FIG. 1, sheath 34 has a generally elongated shape with a cavity 35 in a head portion 36 of the sheath. Cavity 35 is funnel-like in configuration having tapering side wall 37 terminating at the narrower end of the funnel-like cavity 35 within an inner portion of sheath 34. A passageway 38 is disposed generally coaxially with respect to the axis of sheath 34. Passageway 38 extends from the narrower end of cavity 35 at head portion 36 to a tail portion 39 integrally formed with sheath 34 and terminates at an orifice 40. The diameter of orifice 40 and of sheath passageway 38 is sufficient to admit coaxial cable 10 such that a sleeve-like fit is provided between cable 10 and sheath 34. Tail portion 39 of sheath 34 provides means for relieving mechanical stress at the juncture of cable 10 and terminal 15 inasmuch as the tail portion provides an extended region of flexible support for a portion of cable 10 contained within passageway 38 which becomes increasingly flexible from the broader portion of the narrower portion of tail 39.

The wall 37 of funnel-like cavity 35 terminates at head portion 36 forming ring-like shoulder 41. Projecting beyond shoulder 41 and integrally formed with the outside wall of sheath 34 is a collar 42 extending a substantial length in overlapping relationship with the outside wall of terminal body 16. As can be seen in FIG. 1, ring-like shoulder 41 and collar 42 of sheath 34 cooperate with a ring-like shoulder 43 of terminal body 16 to form an interlocking connection between sheath 34 and terminal body 16. This interlocking connection provides mechanical securement of the sheath onto the terminal body. The interlocking connection also provides a sealing connection that protects the inner elements of terminal 15 from exposure to water, dust, paint, or other contaminating materials.

An additional interlocking connection between terminal body 16 and sheath 34 is provided by coaction of notches 45 located in a portion of the outside wall of terminal body 16 with shoulders 46 integrally formed upon a corresponding portion of the inside wall of sheath collar 42. The interlocking connection provided by shoulders 46 nesting in notches 45 provides improved mechanical securement of sheath 34 upon terminal body 16 that resists axial and torsional dislocation of sheath 34 from terminal body 16. The tendency for axial dislocation between sheath 34 and terminal body 16 may occur when tension is applied to the cable or the terminal connector is flexed during use of the cable and terminal connector assembly. This additional interlocking connection may be especially beneficial to maintaining mechanical securement of sheath 34 onto terminal body 16 where the sheath and terminal body may be molded onto materials like Teflon ® plastics which do not form particularly good adhering connections with other materials.

The assembly of sheath 34 onto terminal body 16 provides the means for securing the mesh of flared ground conductor wires to, or within, the dielectric materials of which terminal connector 15 is comprised. The mesh of flared ground wires is held against wall 28 of tail end 27 by complementary-shaped sloping or tapering side wall 37 of sheath cavity 34. As can be seen in FIG. 1, there is a substantial area of contact available at the interface of the adjacent tapering side walls of sheath 34 and tail end 27. The means for securing ground wire mesh 33 to terminal 15 may thus comprise a large portion of the entire surfaces of contact available at these complementary tapering and fitting side walls 28 and 37. Since the areas of contact of walls 28 and 37 with the mesh is relatively large, no single wire, or portion of a single wire, of the mesh has a force exerted upon it by the walls which may be great enough to cause breakage of the wire during repeated flexing of the cable-to-terminal junction.

Hence, there is provided by the assembly of sheath 34 and terminal body 16 means for securing a ground shield conductor of a coaxial cable to a terminal connector whereby the mechanical stress of the ground shield conductor-to-terminal junction is distributed to a degree that substantially eliminates the tendency for breaking of the ground conductor wires at the junction over the useful life of the coaxial cable.

There is also provided within terminal 15 means for relieving electrical stress that may exist between high voltage central conductor 11 and surrounding elements having lower electrical potentials, such as ground shield conductor 13. High electrical stress between central conductor 11 and ground conductor 13 may be created within the dielectric material of insulating jacket 12 when a high voltage is imposed upon central conductor 11. Short circuit conditions or current leakage paths may form when the dielectric material becomes cracked from age or from repeated twisting and bending of the terminal connector. Also, the insulation of a high voltage central conductor may become cracked, or penetrated by, the frayed but sharp-pointed ends of the wires making up braided ground conductor 12 when a coaxial cable is joined to a terminal connector during manufacture. The likelihood of insulation jacket 12 being penetrated by sharp-pointed ends of ground wires during assembly of a cable and terminal is substantially eliminated by the sheath and terminal body assembly of FIG. 1. Tapered wall 32 of tip 29 comprises the means for flaring the braided ground conductor as it is separated from insulating jacket 12. Flaring of the braided ground lead away from insulating jacket 12 tends to minimize the likelihood of penetration of the insulating jacket 12 by the sharp-pointed wires of the flared ground lead.

Means for reducing electrical stress within terminal 15 is also provided by the divergent spatial relationship between the individual termini of mesh 33 formed by the flared ground lead. As can be seen in FIG. 1, mesh 33 is secured along the interface formed by wall 28 of tail end 27 and wall 37 of sheath 34. The defined interface diverges outwardly from the axis of high voltage central conductor 11 so that the wires of ground conductor 13 secured at the interface also diverge from the central conductor axis. Individual termini of ground shield conductor 13 thus lie at a radial distance outwardly from central conductor 11 that is substantially greater than the radial distance between central conductor 11 and outer ground conductor 13 of an unflared portion of coaxial cable 10. As a consequence, the electric field intensity existing within the dielectric materials between high voltage central conductor 11 and the termini of ground conductor 13 is relatively less than that existing within an unflared portion of the cable. With a decrease in the electric field intensity within the cable-to-terminal junction there is a lessening of, or distribution of, electrical stress within the junction.

Preferably, mesh 33 extends along substantially the entire areas of contact of the surfaces of complementary tapering and fitting sidewalls 28 and 37 in order to provide maximum distribution of mechanical or electrical stresses, or both, within the junction of ground mesh 33 and the dielectric materials of terminal connector 15. Thus mesh 33 will preferably extend to the head-most end of sheath 34 where ring-like shoulder 41 abuts with terminal body ring-like shoulder 43. It is especially preferred that mesh 33 at its terminus form a flange 47 extending along an appreciable portion of the interface of shoulder wall 41 and the wall portion at base 30 of tail end 27. The purpose of flange 47 is to ensure that the mesh 33 is firmly secured within the dielectric materials of terminal connector 15. The flared portion of mesh 33 which makes up flange 47 thus provides an additional reinforcing element that aids in preventing axial movement of the cable terminus within terminal connector 15 when, for example, tension is applied to the cable during normal use of the cable-and-connector assembly.

This especially preferred arrangement of mesh 33 flared to form flange 47 also provides a further reduction in the electrical stresses between a high-voltage carrying central conductor and the individual termini of the wires making up the ground conductor mesh by further increasing the radial distance between the individual termini and the high voltage central conductor.

The described coaxial cable terminal has an advantage of relatively inexpensive manufacture. Moreover, mass manufacturing of the described terminal may be accomplished with a high degree of uniformity and reliability among the mass-produced units.

One preferred method of making a coaxial cable terminal connector of the type described includes firstly, placing a high temperature molding plastic in a mold together with a high voltage contact element comprising an assembly of banana plug 17, conductor 22 and receptacle 23, to form a terminal body 16. Secondly, a coaxial cable 10 having a portion of braided ground conductor 13 removed from the terminus of the insulated high voltage central conductor is inserted into passageway 26 of terminal body 16. As the insulated high voltage conductor passes through passageway 26 and makes electrical contact with receptacle 23, there is a separating and flaring of braided ground conductor 13 from the high voltage central conductor at orifice 31 by the coaction of orifice 31 with tip 29 and tapered wall 32. Fourthly, there is a securing of the mesh 33 formed from the flared ground conductor along the tapering wall 28 of terminal body tail end 27 by the molding of a sheath of dielectric material 34 around the flared ground wires which lie along tapered wall 28. The fourth step of the method also secures the sheath 34 to the outer insulating jacket 14 of coaxial cable 10 and forms a mechanically secured and hermetically sealed junction at complementary-fitting, ring-like shoulders 41 and 43, respectively, of sheath 34 and terminal body 16, which is further secured by the interlocking connection between terminal body notches 45 and sheath collar shoulders 46.

Although the terminal connector of the invention has been described for connection with a terminus of a coaxial cable, the terminal connector may be utilized with other types of shielded cable, as well. For example, a triaxial cable may be used which has a third conductor, preferably braided, surrounding coaxial cable 10 depicted in FIG. 1. In a triaxial cable as used in an induction-charging spraying system, for example, the first, or central, conductor and the third, or outer, conductor provide the high voltage carrying and grounding shield functions as described in detail above for the coaxial cable system. The second, or middle, conductor of a triaxial cable, however, may carry a potential that is intermediate in value of the high voltage and ground potentials. This second, or middle, conductor may function as a guard potential shield that provides additional protection from stray capacitive effects. In this embodiment of the invention, the guard potential shield may have a flared terminus within the terminal connector of the invention that is secured within the dielectric material in much the same way as described for the outer conductor of the coaxial cable connection. Another sheath of dielectric material, much like that of sheath 34, may then be used to provide a similar connection of a flared third conductor, acting as a grounding conductor, to the outer tapered wall of sheath 34.

In still another embodiment, the connector terminal of the invention may be assembled upon a terminal of a non-coaxial type cable having one or more high-voltage carrying conductors contained within and surrounded by a braided shield conductor. In this embodiment, the one or more inner conductors, which correspond to the first or central conductor of a coaxial or triaxial cable, may be joined to a high voltage contact element within a terminal connector as described in detail above for a coaxial cable central conductor. The braided shield conductor which corresponds to the second conductor of a coaxial cable may be flared and joined with the dielectric material of the terminal connector utilizing similar structural elements as disclosed for the coaxial cable terminal connector assembly.

It should be noted further that some types of coaxial or non-coaxial cables may have ground or shielding second conductors that are not braided or braid-like. Rather, the second conductor might be in the form of a continuous foil surrounding the first conductor. These types of cables may also be joined to a terminal connector of the invention. A flared, funnel-like conductive element having a configuration suitable to mate with tapering wall 28 of terminal body 16 may be soldered to, or integrally formed from, the terminus of the second conductor. This flared funnel-like element will thus provide the advantages of mechanical and electrical stress relief within the junction of the second conductor and the dielectric material of the terminal body as described above in the discussion of the flared braided second conductor.

From the foregoing description, one skilled in the art can easily ascertain the essential characteristics of the invention, and without departing from the spirit and scope thereof, can make various changes and modifications to adapt it to various usages and conditions.

What is claimed is:

1. A method for attaching a terminal connector to a cable of a type having a first conductor, an insulating material covering the first conductor, a braided seconsd conductor surrounding the insulated first conductor, and an insulating material covering the second conductor, to provide an assembly of a cable and connector terminal useful in high DC voltage, low current electrostatic applications operable in a range of from minimal voltage to about 25,000 volts, said method comprising the steps of:

(a) providing a terminal body fabricated of dielectric material having a head portion, a frusto-conically shaped tail portion, a passageway connecting the head and tail portions, and a high voltage contact element secured within the head portion across the passageway, the tail portion having a frusto-conically shaped tip, then narrower annular-shaped end of the tip defining an orifice in communication with the passageway, the orifice having a diameter sufficient to permit an insulated first conductor of a cable to enter the passageway but insufficient to permit the braided second conductor of the cable to enter the passageway;

(b) inserting the insulated first conductor of the cable into the passageway at the orifice in the terminal body tail portion;

(c) separating the braided second conductor of the cable from the insulated first conductor at the orifice of the passageway as the insulated first conductor passes through the orifice;

(d) flaring the braided second conductor of the cable outwardly along the side wall of the frusto-conically shaped tip in a direction away from the axis of the first conductor as the insulated first conductor passes through the orifice;

(e) providing a sheath of dielectric material having a cavity within which the terminal body tail portion is nested, the cavity having a tapering wall of a configuration complementary to the tapering wall of the terminal body tail portion; and (f) securing the sheath of dielectric material on the terminal body so that the complementary fitting tapering walls coact to secure the termini of the separated and flared braided second conductor within the interface between the dielectric materials of the terminal body and the sheath to completely enclose the termini of the braided second conductor for electrical stress relief and to provide an electrically isolated termination for the braided second conductor.

2. The method of claim 1 further comprising providing the terminal body of dielectric material by molding the terminal body of a high-temperature molded plastic.

3. The method of claim 2 wherein the high-temperature molded plastic is a phenolic plastic.

4. The method of claim 1 further comprising providing said sheath of dielectric material by molding a quantity of dielectric material around the tail end of said terminal body to form said tapering wall of dielectric material securing the termini of the flared braided second conductor of the cable to the tapering wall of said terminal body tail portion.

5. The method of claim 4 further comprising providing said sheath of dielectric material by molding said sheath of a low-temperature molded plastic.

6. The method of claim 5 wherein said low-temperature molded plastic is a polyethylene plastic.

7. A cable terminal connector for attachment to the terminus of a cable of a type having a first conductor, an insulating material covering the first conductor, a second conductor surrounding the insulated first conductor, and a second insulating material covering the second conductor, the terminal connector being operable in a range of from minimal DC voltage to about 25,000 volts in low current electrostatic applications to provide a high voltage connector for the first conductor and to provide an electrically floating termination for the second conductor, the connector comprising:

(a) a terminal body of dielectric material, said terminal body having a head portion, a tail portion and a passageway having an axis, said passageway connecting said head portion and said tail portion and adapted to receive a terminal portion of an insulated first conductor of a cable, and tail portion providing a wall sloping toward said head portion and away from said axis at an acute angle with said axis;

(b) a high voltage contact element having a first end secured within said terminal body and having a second end adapted to make electrical contact to another high voltage carrying element;

(c) means adapted to receive a terminus of a first conductor of a cable and to provide electrical connection between the conductor and said first end of said high voltage contact element;

(d) a sheath of dielectric material cooperating with said tail portion of said terminal body, said sheath having a cavity with a sloping wall, said tail portion of said terminal body being nested within said cavity so that said sloping wall of said tail portion and said sloping wall of said cavity form an interface adapted to receive at least a portion of a flared terminus of a second conductor of a cable between said sloping wall of said tail portion and said sloping wall of said cavity, said interface sloping outwardly and adapted to secure a flared terminus of a second conductor a radial distance outwardly from a first conductor that is substantially greater than the radial distance between the first conductor and the second conductor of an unflared portion of a cable, said interface being adapted to enclose the second conductor terminus within the dielectric materials of said terminal body and said sheath to provide mechanical and electrical stress relief.

8. The terminal connector of claim 7, wherein said tail portion of said terminal body has a frusto-conically shaped tip, the narrower annular-shaped end of said frusto-conically shaped tip defining an orifice in communication with said passageway, said orifice having a diameter sufficient to permit an insulated first conductor of a cable to enter said passageway but insufficient to permit the second conductor of a cable to enter said passageway whereby the second conductor is separated and flared away from the insulated first conductor of a cable as the insulated first conductor enters said orifice.

9. The terminal connector of claim 8 wherein said terminal body dielectric material is a high-temperature molded plastic and said sheath is a low-temperature molded plastic.

10. The terminal connector of claim 9 wherein said high-temperature molded plastic is a phenolic plastic.

11. The terminal connector of claim 9 wherein said low-temperature molded plastic is polyethylene.

12. In combination, a cable and terminal conductor therefor, comprising:
 a cable of a type having a first conductor, an insulating material covering said first conductor, a second conductor surrounding said insulated first conductor, and a second insulating material covering said second conductor;
 a terminal connector attached to the terminus of said cable and being operable in a range of from minimal DC voltage to about 25,000 volts in low current electrostatic applications to provide a high voltage connection for said first conductor and to provide an electrically isolated termination for said second conductor, said connector including a terminal body of dielectric material, said terminal body having a head portion, a tail portion, and a passageway having an axis, said passageway connecting said head portion and said tail portion and receiving a terminal portion of said insulated first conductor, said tail portion providing a wall sloping toward said head portion and away from said axis at an acute angle therewith;
 a high voltage contact element having a first end secured within said terminal body and extending into said passageway, and having a second end adapted to make electrical contact with another high voltage carrying element;
 means securing a terminus of said first conductor to said first end of said high voltage contact element to provide electrical connection therewith;
 a sheath of dielectric material having a cavity with a sloping wall, said sloping wall having a configuration complementary to the sloping wall of said terminal body tail portion, said tail portion being nested within said cavity so that said sloping wall of said tail portion and said sloping wall of said cavity form an interface sloping toward said head portion and away from the axis of said passageway;
 an outwardly flared terminus portion of said second conductor secured within said interface between said sloping wall of said tail portion and said sloping wall of said cavity, and terminus portion of said second conductor at a radial distance outwardly from said first conductor that is substantially greater than the radial distance between said first conductor and said second conductor at an unflared portion of said cable, whereby said terminus portion of said second conductor is enclosed within the dielectric materials of said terminal body and said sheath to provide mechanical and electrical stress relief.

* * * * *